United States Patent
Yukawa

(10) Patent No.: US 9,102,201 B2
(45) Date of Patent: Aug. 11, 2015

(54) RUN-FLAT TIRE

(71) Applicant: SUMITOMO RUBBER INDUSTRIES, LTD., Kobe-shi, Hyogo (JP)

(72) Inventor: Naoki Yukawa, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 232 days.

(21) Appl. No.: 13/906,388

(22) Filed: May 31, 2013

(65) Prior Publication Data

US 2014/0034205 A1 Feb. 6, 2014

(30) Foreign Application Priority Data

Aug. 6, 2012 (JP) ................. 2012-174230

(51) Int. Cl.
*B60C 17/00* (2006.01)
*B60C 17/04* (2006.01)
*B60C 15/00* (2006.01)

(52) U.S. Cl.
CPC ....... *B60C 17/0009* (2013.04); *B60C 2015/061* (2013.04); *B60C 2017/0063* (2013.04); *B60C 2017/0072* (2013.04)

(58) Field of Classification Search
CPC ...... B60C 17/00; B60C 17/0009; B60C 15/00
See application file for complete search history.

(56) References Cited

U.S. PATENT DOCUMENTS 6,510,883 B2 * 1/2003 Baumann et al. ............. 152/454

FOREIGN PATENT DOCUMENTS

EP 2 431 197 A1 3/2012
JP 2008-29404 A 2/2008

OTHER PUBLICATIONS

Extended European Search Report, dated Oct. 29, 2013, for Patent Application No. 13169705.4.

* cited by examiner

*Primary Examiner* — Justin Fischer
(74) *Attorney, Agent, or Firm* — Birch, Stewart, Kolasch & Birch, LLP

(57) ABSTRACT

A run-flat tire with an aspect ratio of 50% to 60%, which comprises a carcass consisting of a single ply of cords extending between bead cores through a tread portion and sidewall portions, a pair of sidewall reinforcing layers each with a crescent cross-sectional shape and disposed axially inwardly of the carcass in each sidewall portion, the sidewall reinforcing layers made of rubber having a complex elastic modulus of from 6 to 12 MPa, and a pair of bead apex elements which extending radially outwardly of the tire from bead cores, each bead apex element having a height of from 0.30 to 0.48 times a tire section height from a bead base-line, wherein the tire has certain relations with respect to thicknesses of sidewall reinforcing layers and sidewall rubber elements.

5 Claims, 6 Drawing Sheets

RUN-FLAT TIRE

BACKGROUND OF THE INVENTION

1. Field of the Invention

The present invention relates to a run-flat tire having improved run-flat durability without increasing rolling resistance and a spring constant.

2. Description of the Related Art

Conventionally, a run-flat tire that has a sidewall reinforcing layers each with a crescent cross-section shape in each sidewall portions is well known. Since the sidewall reinforcing layer can support a tire load in place of the internal air, the run-flat tire enables the vehicle to continue to be driven at a certain high speeds for limited certain distances when punctured.

The conventional run-flat tire with sidewall reinforcing layers, however, is liable to deteriorate ride comfort due to increased spring constant. Additionally, since the run-flat tire is liable to have a large weight, the tire has a problem that rolling resistance is larger.

SUMMARY OF THE INVENTION

The present invention has been worked out in light of the circumstances described above, and has a main object of providing a run-flat tire having improved run-flat durability without increasing rolling resistance and a spring constant. In accordance with the present invention, there is provided A run-flat tire comprising: an aspect ratio being in a range of from 50% to 60%; a tread portion; a pair of sidewall portions; a pair of bead portions each having a bead core therein, each of said bead portions having a thickness in a range of from 12 to 16 mm at a position that has a 17 mm height from a bead base-line; a carcass consisting of a single ply of cords which extends between bead cores through the tread portion and sidewall portions; a pair of sidewall reinforcing layers each having a crescent cross-sectional shape and disposed axially inwardly of the carcass in each said sidewall portion, said sidewall reinforcing layers made of rubber having a complex elastic modulus in a range of from 6 to 12 MPa, said sidewall reinforcing layers having radially outer ends positioned higher than a buttress position that has a height of 0.72 times a tire section height from the bead base-line, said sidewall reinforcing layers having radially inner ends positioned lower than a first bead position that has a height of 0.22 times of the tire section height from the bead base-line; a pair of sidewall rubber elements each of which is disposed axially outwardly of the carcass in each said sidewall portion; and a pair of bead apex elements each of which extends and tapers radially outwardly of the tire from said bead core, the bead apex elements having a height in a range of from 0.30 to 0.48 times of the tire section height from the bead base-line;

wherein the tire has the following relations (1) to (4):

$$0.009 \leq ti1/\{(10.3-0.32P) \cdot LI\} \leq 0.011 \quad (1);$$

$$0.0092 \leq ti2/\{(8.5-0.32P) \cdot LI\} \leq 0.0108 \quad (2);$$

$$0.009 \leq (ti3+ti4)/\{(7.5-0.32P) \cdot 2LI\} \leq 0.011 \quad (3); \text{ and}$$

$$0.0092 \leq (ts3+ts4)/(12 \cdot LI) \leq 0.0108 \quad (4),$$

wherein "ti1" (unit: mm) is a thickness of said sidewall reinforcing layer at a tire overall-width position that has a height of 0.55 times the tire section height from the bead base-line, "ti2" (unit: mm) is a thickness of said sidewall reinforcing layer at the buttress position, "ti3" (unit: mm) is a thickness of said sidewall reinforcing layer at the first bead position, "ti4" (unit: mm) is a thickness of said sidewall reinforcing layer at a second bead position that has a height of 0.34 times the tire section height from the bead base-line, "ts3" (unit: mm) is a thickness of said sidewall rubber element at the first bead position, "ts4" (unit: mm) is a thickness of said sidewall rubber element at the second bead position, "P" (unit: MPa) is a complex elastic modulus of said sidewall reinforcing layer, and "LI" (index) is a load index of the tire.

Preferably, a plurality of dimples are provided on an outer surface of at least one of sidewall portions of the tire.

Preferably, dimples are provided in an area being radially inwardly of a maximum width position of the tire.

Preferably, a plurality of fins are provided on an outer surface of at least one of sidewall portions of the tire.

Preferably, the tire has an internal cavity surface, a part of the internal cavity surface is formed by an inner liner made of rubber with low air permeability, and the inner liner disposed between radially outer ends of said sidewall reinforcing layers so as to have an overlapped length in a range of from 3 to 15 mm with each sidewall reinforcing layer at both ends thereof.

DETAILED DESCRIPTION

An embodiment of the present invention will be explained below with reference to the accompanying drawings.

Figure 1:
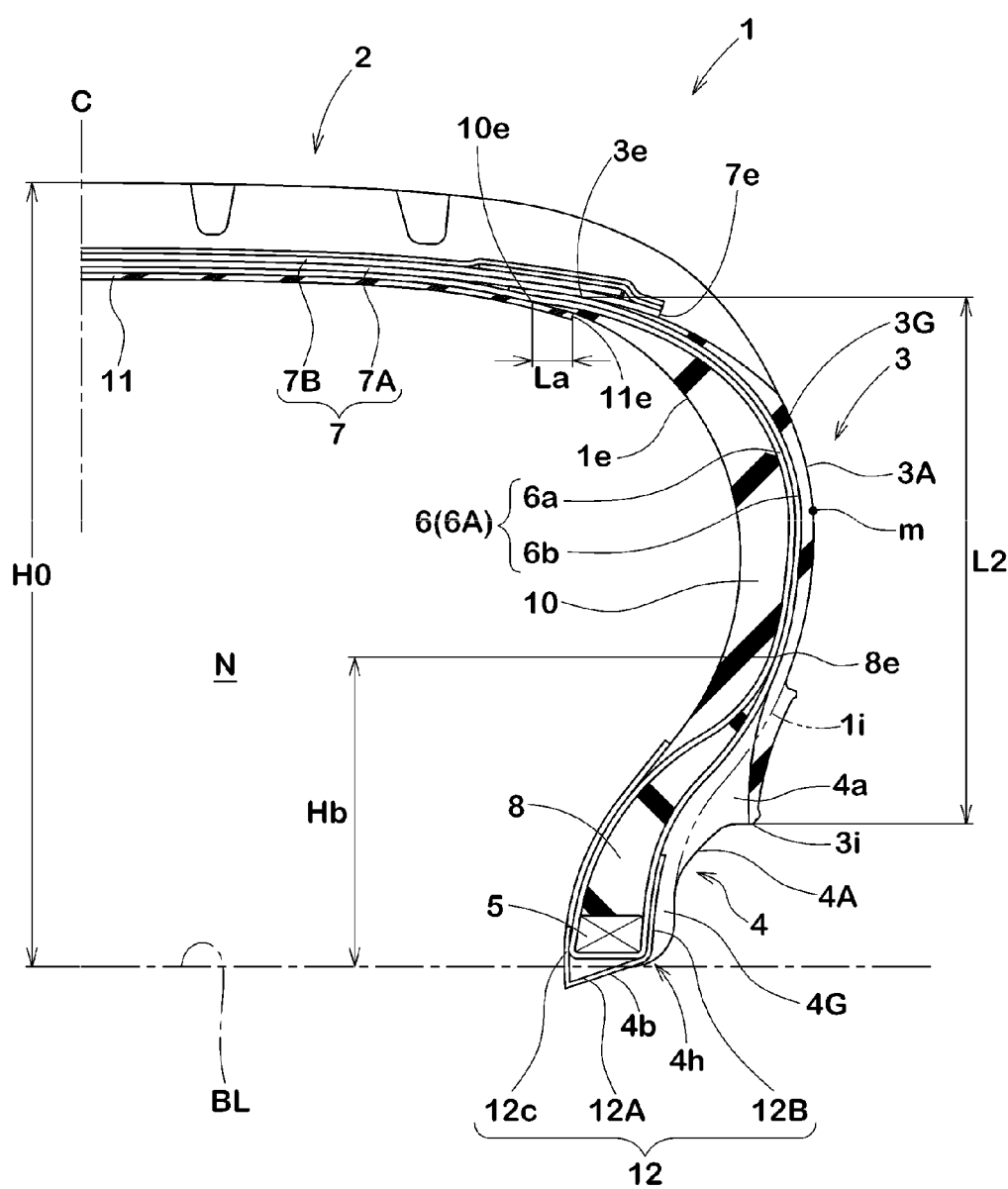
FIG. 1 is a right side cross sectional view of a run-flat tire showing an embodiment of the present invention.
Figure 2:
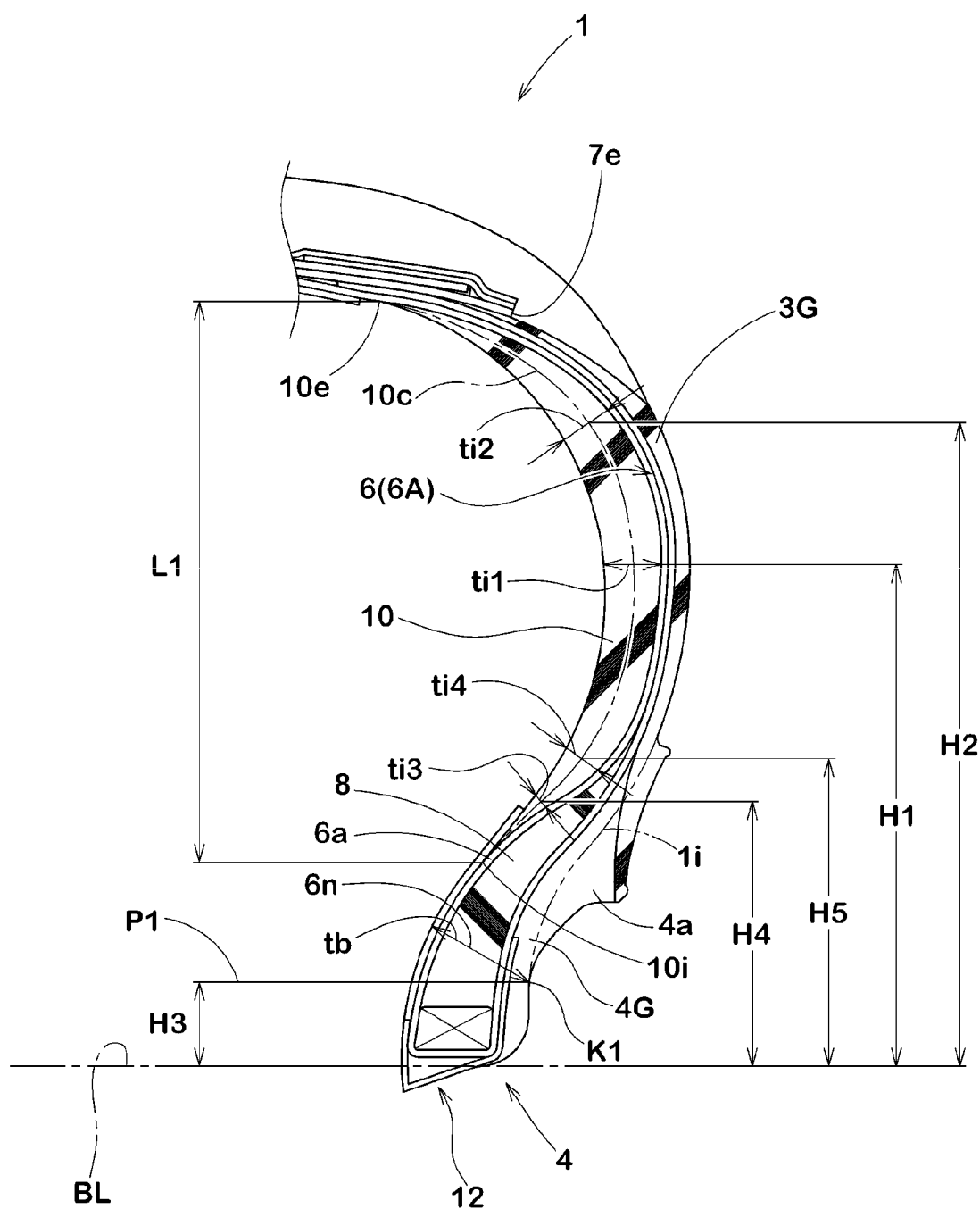
FIG. 2 is a partial enlarged view of FIG. 1.

FIG. 1 shows a run-flat tire 1 in accordance with the present embodiment, in a tire meridian section including a tire axis under a standard condition. FIG. 2 is a partial enlarged view of FIG. 1.

Here, the standard condition is such that the tire 1 is mounted on a standard wheel rim and is inflated to a standard pressure but loaded with no tire load. In this application including specification and claims, various dimensions, positions and the like of the tire refer to those under the standard condition of the tire unless otherwise noted.

The standard wheel rim is a wheel rim officially approved or recommended for the tire by standards organizations, the standard wheel rim is the "standard rim" specified in JATMA, the "Measuring Rim" in ETRTO, the "Design Rim" in TRA or the like, for example. The standard pressure is the "maximum air pressure" in JATMA, the "Inflation Pressure" in ETRTO, and the maximum pressure given in the "Tire Load Limits at various Cold Inflation Pressures" table in TRA or the like.

As shown in FIG. 1, the run-flat tire 1 in accordance with the present embodiment comprises: a tread portion 2; a pair of sidewall portions 3 each of which extends radially inward from the axially outer end of the tread portion 2; and a pair of bead portions 4 each of which is provided radially inside the sidewall portion 3 and has a bead core 5 therein. The tire 1, for example, is illustrated as a passenger vehicle tire having an aspect ratio of from 50% to 60%. The aspect ratio means a ratio of a tire section height H0 to a tire section width.

The tire 1 includes a carcass 6 extending between bead cores 5 through the tread portion 2 and sidewall portions 3 and a belt layer 7 disposed radially outwardly the carcass 6 in the tread portion 2.

The carcass 6 consists of a single ply 6A of cords which comprises a main portion 6a extending between bead cores 5, 5 through the tread portion 2 and sidewall portions 3, and a pair of turn-up portions 6b each turned up around the bead core 5 from axially inside to outside of the tire. The carcass cords are arranged at an angle in a range of from 75 to 90 degrees with respect to a tire equator C. For the carcass cords, organic fiber cords or steel cords can be used. The single ply 6A of the carcass 6 helps to prevent from increasing the tire weight.

In this embodiment, the carcass 6 has a high turn-up structure that has radially outer ends of turn-up portions 6b being located between the belt layer 7 and the main portion 6a, whereby efficiently enhances bending rigidity of the sidewall portion 3.

The belt layer 7 comprises at least two belt plies 7A, 7B of high modulus cords such as steel cords laid at an angle of from 15 to 40 degrees with respect to the tire equator C so that each steel cord of plies is crossed. In this embodiment, radially outer belt ply 7B has a width smaller than that of the radially inner belt ply 7A.

The tire 1 further comprises: a pair of bead apex elements 8 each of which extends and tapers radially outwardly of the tire from the bead core 5; a pair of sidewall rubber elements 3G each of which is disposed axially outwardly of the carcass 6 in each sidewall portion 3; a pair of sidewall reinforcing layers 10 each of which is disposed axially inwardly of the carcass 6 in each sidewall portion 3; an inner liner 11 disposed along an internal cavity surface 1e; a pair of clinch rubber elements 4G each of which is disposed axially outwardly of the carcass 6 in each bead portion 4 to form an outer surface of the bead portion 4; and a pair of rubber chafers 12 each of which has a u-shaped so as to surround the bead core 5.

The bead apex element 8 has a height Hb from the bead base-line BL to the radially outer end 8e thereof, and the height Hb is set in a range of from 0.30 to 0.48 times of the tire section height H0, whereby enhances bending rigidity of the bead portion 4 while preventing from increasing the spring constant of tire 1. Namely, when the height Hb is less than 0.30 times the tire section height H0, run-flat durability of the tire is liable to deteriorate due to low bending rigidity of the bead portion 4. When the height Hb is more than 0.48 times the tire section height H0, ride comfort of the tire is liable to deteriorate due to high bending rigidity of the sidewall portion 3.

Here, the tire section height H0 is not actual measurement value but calculated value which is calculated using the tire size including a tire section width (unit: mm) and an aspect ratio (unit: %) branded on the sidewall portion 3. For example, when a tire has the size indication of "195/60R14", the tire section height is calculated as follows:

195(mm)*60%=117(mm)

Each of bead apex elements 8 is preferably made of rubber having a complex elastic modulus E* in a range of from 5 to 20 MPa. In this specification and claims, the complex elastic modulus E* is measured with a visco-elasticity spectrometer at a temperature of 70 degrees C., frequency of 10 Hz, initial strain of 10%, and amplitude of Dynamic strain of +/−1%.

Each of sidewall rubber elements 3G has a radially outer end 3e being located between the belt layer 7 and the turn-up portion 6b, and a radially inner end 3i positioned lower than the radially outer end 8e of the bead apex element 8. The sidewall rubber element 3G is preferably made of rubber having hardness smaller than that of the bead apex element 8. Preferably, the sidewall rubber element 3G has a complex elastic modulus E* in a range of from 1 to 10 MPa.

Referring to FIG. 2, each of sidewall reinforcing layers 10 with a crescent cross-sectional shape comprises a radially outer end 10e positioned higher than a buttress position that has a height H2 of 0.72 times the tire section height H0 from the bead base-line BL and a radially inner end 10i positioned lower than a first bead position that has a height H4 of 0.22 times the tire section height H0 from the bead base-line BL. Accordingly, since the bending rigidity of sidewall portions 3 is enhanced, deformation of sidewall portions 3 when punctured is reduced so that run-flat durability of the tire is improved. In order to further improve the advantage above without increasing the tire weight, the radial length L1 of the sidewall reinforcing layer 10 is preferably in a range of from 80% to 120% of a radial length L2 (shown in FIG. 1) of the sidewall rubber element 3G.

The sidewall reinforcing layer 10 is made of rubber having a complex elastic modulus in a range of from 6 to 12 MPa, whereby makes it possible to improve run-flat durability of tire while decreasing the tire weight by offering the sidewall reinforcing layers with small thicknesses. When the complex elastic modulus of sidewall reinforcing layer 10 is less than 6 MPa, a large thickness is required for the sidewall reinforcing layers 10 to sufficiently improve the bending rigidity of sidewall portions 3, whereby tends to increase the tire weight. When the complex elastic modulus of sidewall reinforcing layer 10 is more than 12 mPa, the spring constant of tire is increased due to too much enhanced sidewall rigidity of the tire.

Referring to FIG. 1, the tire 1 has a cavity N surrounded by an internal cavity surface 1e. A part of the internal cavity surface 1e is formed of the inner liner 11 made of rubber with low air permeability which is disposed radially inwardly of the carcass 6. Preferably, the inner liner 11 is disposed between radially outer ends 10e, 10e of sidewall reinforcing layers 10, 10 so as to overlap with each sidewall reinforcing layers 10 at an overlapped length La in a range of not less than 3 mm, more preferably not less than 5 mm, but preferably not more than 15 mm, still more preferably not more than 12 mm, in order to maintain air permeability property of the tire as well as durability of carcass 6. Since most of axially inner surface of sidewall reinforcing layers 10 is exposed to the cavity N, heat generated from the sidewall reinforcing layers 10 of the tire is efficiently discharged. Therefore, heat degradation of sidewall reinforcing layers 10 may be prevented so that run-flat durability of the tire improves. Additionally, such an inner liner 11 helps to decrease the tire weight.

Each of clinch rubber elements 4G is connected with the radially inner end 3i of the sidewall elements 3G and extends radially inwardly of the tire to the heel portion 4h of the bead portion 4. The complex elastic modulus of the clinch rubber element 4G is preferably in a range of from 3 to 20 MPa in order to prevent the outer surface 4A thereof from wear as well as damage due to contact with a rim.

Each rubber chafer elements 12 comprises a base portion 12A forming a bottom 4b of the bead portion 4, an axially outer portion 12B extending radially outwardly from the base portion 12A along the turn-up portion 6b of the carcass 6, and an axially inner portion 12C extending radially outwardly from the base portion 12A along the main portion 6a. For the rubber chafer element 12, a rubber being reinforced with fibers is preferably employed. The complex elastic modulus of the rubber chafer element 12 is preferably in a range of from 1 to 8 MPa in order to maintain a higher contacting pressure with a rim while preventing the bottom 4b from the damage.

In this embodiment, each bead portions 4 has an axially protruding protector rib 4a on its outer surface 3A for protecting a rim flange from damage. The protector rib 4a continuously extends in the circumferential direction of the tire and is formed using both of the clinch rubber element 4G and the sidewall rubber element 3G. Such a protector rib 4a helps to enhance bending rigidity of the bead portion 4 by increased rubber volume of the clinch rubber element with high complex elastic modulus, whereby further improves run-flat durability of the tire.

Referring to FIG. 2, the bead portion 4 has a thickness "tb" in a range of from 12 to 16 mm at a position P1 that has a 17 mm height H3 from the bead base-line BL. This position P1 substantially corresponds to a radially outer end of a rim flange of the rim on which the tire is to be mounted. The thickness "tb" of the bead portion 4 is measured on a normal line 6n which is perpendicular to the main portion 6a of the carcass 6 and passes through the axially outer point K1 of the bead portion 4 at the height H3.

During typically run-flat traveling, the bead portion 4 is significantly bent around the position P1. Accordingly, when the thickness "tb" at the position P1 is less than 12 mm, bending rigidity of the bead portion 4 is insufficient, whereby a large deformation of the bead portion 4 may occur during run-flat traveling. When the thickness "tb" is more than 16 mm, the tire weight may be liable to increase. This position P1 of the bead portion 4 is reinforced the composite member that includes the carcass ply 6A, the bead apex element 8, the rubber chafer element 12 and the clinch rubber element 4G.

Through the results of experiments, the inventor has succeeded to provide a run-flat tire having an improved run-flat durability with low rolling resistance and spring constant, by determining thicknesses of sidewall reinforcing layers 10 as well as sidewall rubber elements 3G at certain positions with heights in association with the load index (LI) of tire and the complex elastic modulus (P) of the sidewall reinforcing layers 10.

Additionally, in order to determine thicknesses above, the inventor employed certain positions of the tire that include a tire overall-width position, the buttress position, the first bead position, and a second bead position.

In this specification and claims, the tire overall-width position means a position that has a height H1 of 0.55 times the tire section height H0 from the bead-base line BL.

The tire overall-width position is subjected to significant bending during run-flat traveling. Besides, even in a standard condition that the tire is inflated with a suitable internal pressure, a large flexure occurs at the tire overall-width position. It means that the rigidity at the tire maximum-width position is a contributory factor for spring constant of the tire. Accordingly, run-flat durability and spring constant of the tire significantly depend on the thickness $ti1$ of sidewall reinforcing layers 10 at the tire overall-width position. For example, when the thickness $ti1$ above is too large, although run-flat durability of the tire improves, the spring constant tends to be higher. When the thickness $ti1$ above is too small, although spring constant becomes smaller so that ride comfort improves, run-flat durability of the tire tends to be deteriorate.

Next, ride comfort as well as spring constant of the tire during the standard traveling condition depends on rigidity of the buttress position of the tire. Additionally, durability of the tire during run-flat traveling also depends on rigidity of the buttress position of the tire. Therefore, the thickness $ti2$ of the sidewall reinforcing layers 10 at the buttress position is a contributory factor for spring constant as well as run-flat durability of the tire. For example, when the thickness $ti2$ is too small, although ride comfort may improve during the standard traveling condition, run-flat durability of the tire tends to deteriorate.

The second bead position means a position that has a height H5 of 0.34 times the tire section height H0 from the bead-base line BL. The first bead position and second bead position of the tire 1, on the other hand, are positions where relatively small flexure occurs during standard traveling condition. Thicknesses $ti3$, $ti4$ of sidewall reinforcing layers 10 at the first and second positions of the tire has less influence with respect to spring constant and rolling resistance of the tire as compared to run-flat durability. Accordingly, it makes possible to provide a run-flat tire with high run-flat durability by offering thicknesses $ti3$, $ti4$ in larger at the first and second positions without increasing rolling resistance. Preferably, such a run-flat tire has the thickness $ti1$ of the sidewall reinforcing layers 10 being reduced at the tire overall-width position. Therefore, the tire 1 in accordance with the present invention provides run-flat durability, ride comfort and rolling resistance.

Thicknesses $ti1$, $ti2$, $ti3$ and $ti4$ of sidewall reinforcing layers 10 described above are determined based on load index of the tire and complex elastic modulus thereof. In the present invention, in the event that the tire has large load index or has small complex elastic modulus E*, thicknesses $ti1$, $ti2$, $ti3$ and $ti4$ are determined in larger. On the other hand, in the event that the tire has small load index or has large complex elastic modulus E*, thicknesses $ti1$, $ti2$, $ti3$ and $ti4$ are determined in smaller.

Thicknesses $ts3$, $ts4$ of the sidewall rubber element 3G at the first and second bead positions (shown in FIG. 3) have influence with respect to the profile of the carcass ply 6A in the sidewall portion 3. In this present invention, the thicknesses $ts3$, $ts4$ of the sidewall rubber element 3G at the first and second bead positions are determined based on the load index of tire.

The tire 1 in accordance with the present invention has thicknesses $ti1$ to $ti4$, $ts3$ and $ts4$ (unit: mm) above satisfying the following relations (1) to (4).

$$0.009 \leq ti1/\{(10.3-0.32P) \cdot LI\} \leq 0.011 \quad (1);$$

$$0.0092 \leq ti2/\{(8.5-0.32P) \cdot LI\} 0.0108 \quad (2);$$

$$0.009 \leq (ti3+ti4)/\{(7.5-0.32P) \cdot 2LI\} \leq 0.011 \quad (3); \text{ and}$$

$$0.0092 \leq (ts3+ts4)/(12 \cdot LI) \leq 0.0108 \quad (4).$$

Here, "P" (unit: MPa) is a complex elastic modulus of the sidewall reinforcing layer, and "LI" (index) is a load index of the tire.

In each relation (1) to (3), when the calculated value is more than the upper limit, spring constant of the tire tends to be much higher. When the calculated value is less than the lower limit, run-flat durability of the tire tends to deteriorated. In the relation (4), when the calculated value is more than the upper limit or less than the lower limit, damage such as ply-loose may be occurred due to unsatisfactory profile of the carcass ply 6A.

The load index is a numerical code stipulating the maximum load (mass) each tire can carry under the usage condition defined by the tire organization "JATAMA". For example, since the tire with a high load index tends to be subjected to heavy load, the run-flat durability tends to deteriorate. Thus, the load index is one of an indicator for determining thicknesses of rubber elements according to each tire load. In each of relations (1) to (4), the tire has large thicknesses of rubber elements in proportion to load index.

The complex elastic modulus $E^*$ is a dynamic modulus of rubber material that is an essential factor for determining the thickness of sidewall reinforcing layer in order to improve run-flat durability. In each of relations (1) to (4), the tire has small thickness of sidewall reinforcing layers with complex elastic modulus thereof.

In this specification and claims, each thickness $ti1$ to $ti4$ of sidewall reinforcing layer 10 is a thickness measured perpendicular to the thickness centerline 10c thereof at each position, shown in FIG. 2. Similarly, each thickness $ts3$ and $ts4$ of the sidewall rubber element 3G is a thickness measured perpendicular to the thickness centerline 3c (shown in FIG. 3) thereof at each position.

Figure 3:
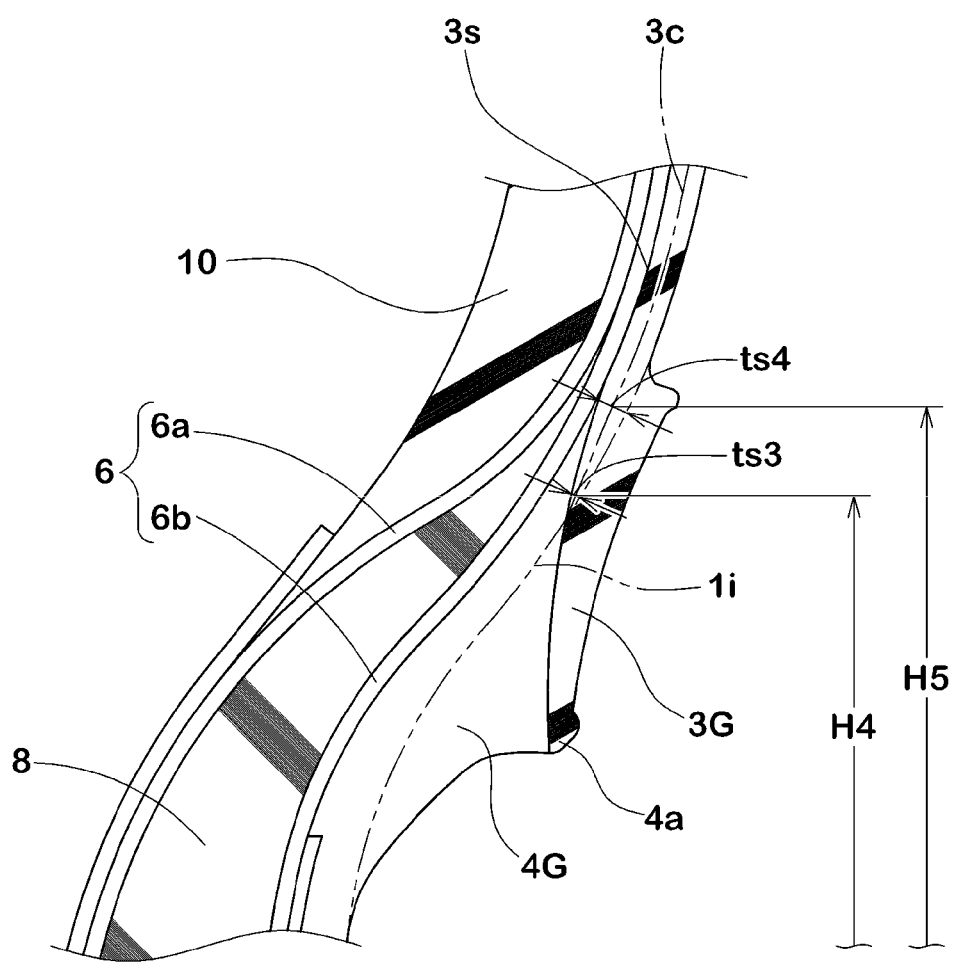
FIG. 3 is a partial enlarged view of FIG. 2.

In case that the tire 1 has the axially protruding protector rib 4a, for purpose of convenience, the axially outer surface of the sidewall rubber element 3G is defined as the imaginary profile 1i that extends along with the outer surface of the carcass 6 except for the protruding protector rib 4a, shown in FIG. 3. Accordingly, the thickness of sidewall rubber elements 3G is defined between the axially inner surface 3s and the imaginary profile 1i. Since the protector rib 4a increases not only rigidity, but also calorific value, with respect to the bead portion 4, the rib is not so helpful for improving run-flat durability of the tire. The protector rib 4a, on the other hand, exerts an influence on thicknesses $ts3$, $ts4$ of the sidewall rubber element 3G that determine a profile of the carcass 6. Accordingly, in order to set the preferable profile of the carcass 6, the thicknesses $ts3$, $ts4$ of the sidewall rubber element are defined except for the protector rib 4a.

The concept of the present invention was obtained through experiments using a tire having a size of 235/55R18 with load index of 100. As described above, the tire 1 in accordance with the present invention can determine thicknesses of sidewall reinforcing layer 10 and sidewall rubber element 3G at each of the tire overall-width position, buttress position, first bead position and second bead position in certain ranges using complex elastic modulus $E^*$ of sidewall reinforcing layer 10 and load index (LI). The present invention may provide a run-flat tire that has high run-flat durability with low rolling resistance and spring constant. The present invention is able to be applied to various run-flat tires having an aspect ratio in a range of from 50% to 60%. When the tire has an aspect ratio of more than 65%, it is difficult to improve run-flat durability due to low sidewall rigidity thereof. When the tire has an aspect ratio of less than 45%, it is also difficult to improve ride comfort.

Figure 4A:
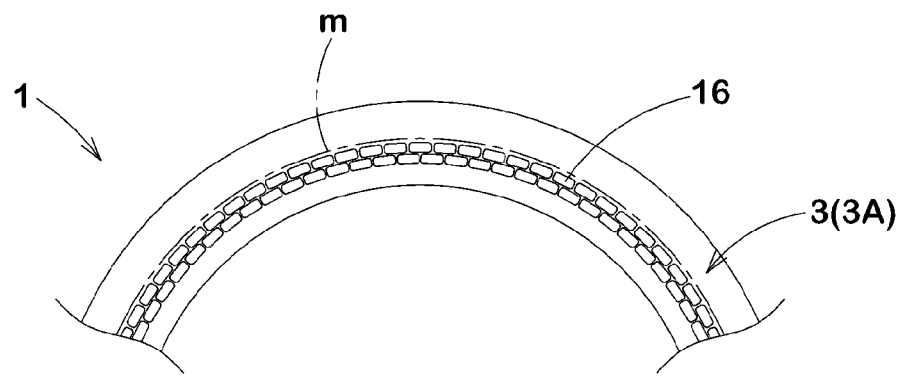
FIGS. 4A to 4C are partial side views of run-flat tires showing other embodiments of the present invention.

FIG. 4A shows a partial side view of a run-flat tire 1 showing another embodiment of the present invention. The tire 1 is provided with a plurality of dimples 16 on its outer surface 3A of the sidewall portion 3. In this embodiment, two rows of dimples 16 are arranged in an area located radially inward of the tire than a tire section width position "m" of the sidewall portion 3. Such a run-flat tire 1 effectively radiates the heat being generated inside the tire so that the heat deterioration of sidewall rubber element 3G is prevented. Additionally, since dimples 16 are provided in the area that is radially inward than the tire section width position "m", spring constant and rolling resistance of the tire is preferably maintained. Here, the tire section width position "m" is a position where the main portion 6a of the carcass ply 6A protrudes axially outermost of the tire.

In this embodiment, each dimple 16 has a circumferentially long rectangular shape. The shape of dimples 16 is not particular limited. For the dimples 16, various shapes such as a circle, an ellipse, a polygon or the like may be embodied.

Figure 5:
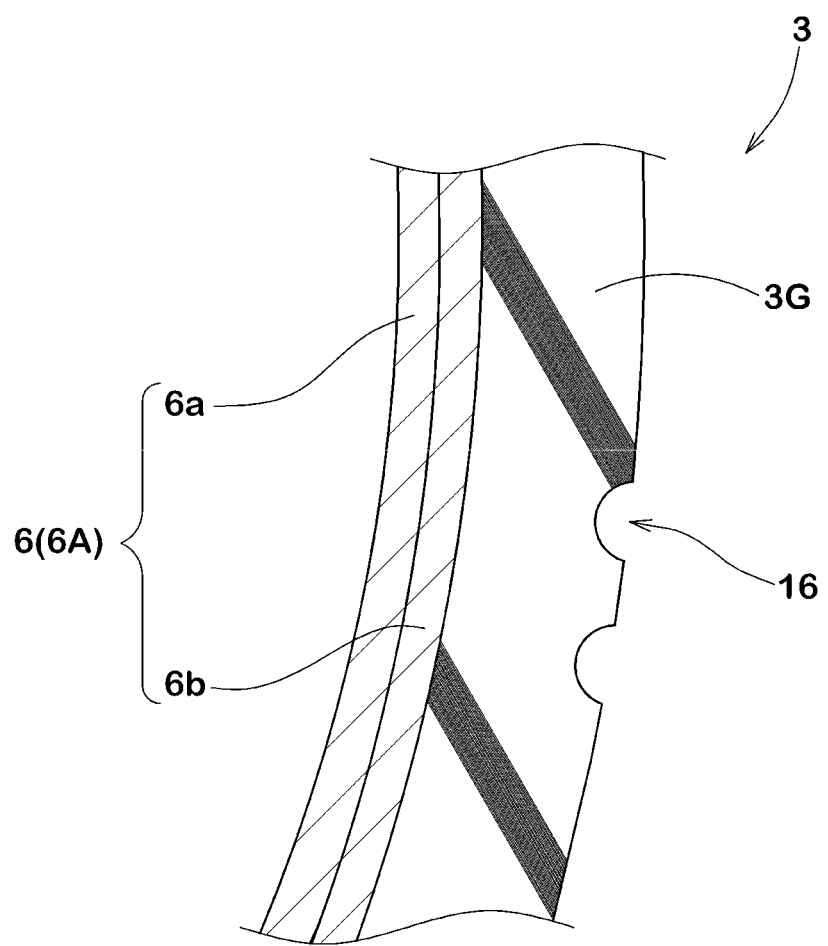
FIG. 5 is a cross sectional view of a sidewall portion of the run-flat tire showing a dimple thereon.

Referring to FIG. 5, each dimple 16 is dented so as to have a smoothly semicircular cross section on the sidewall portion 3 in order to maintain rigidity of the sidewall portion 3. Preferably, each dimple 16 has a circumferential length in a range of from 10 to 25 mm, a radial length in a range of from 5 to 15 mm, and a depth in a range of from 1.0 to 3.0 mm.

Figure 4B:
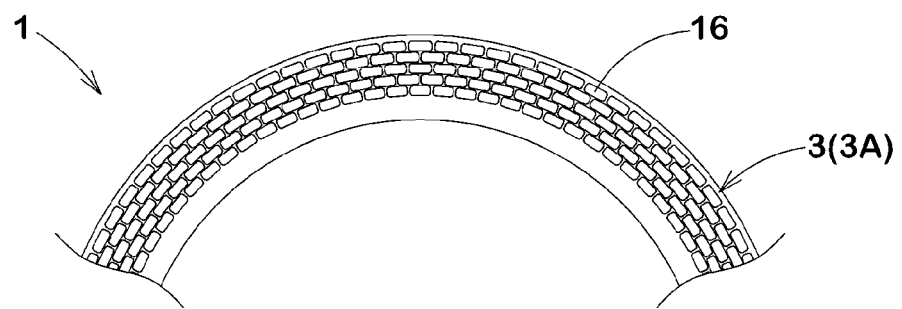

FIG. 4B is a partial side view of a run-flat tire showing another embodiment of the present invention. Referring to FIG. 4B, the tire 1 has five dimple rows each of which includes a plurality of circumferentially arranged dimples 16 on the outer surface 3A of the sidewall portion 3. Such a run-flat tire 1 still further effectively radiates the heat being generated inside the tire by increasing the area surface of the sidewall rubber element 3G.

Figure 4C:
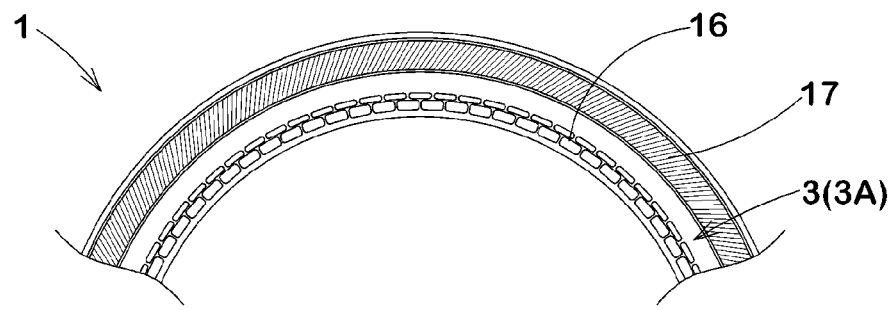

FIG. 4c is a partial side view of a run-flat tire showing another embodiment of the present invention. Referring to FIG. 4C, the sidewall portion 3 is provided with: at least one dimple row that includes a plurality of circumferentially arranged dimples 16; and a circumferentially extending decoration that includes a plurality of ridges arranged in the circumferential direction of the tire. Since the run-flat tire 1 still further effectively radiates the heat being generated inside the tire by increasing the area surface of the sidewall rubber element 3G, run-flat durability is further improved compared with the tire shown in FIG. 4A.

Figure 6:
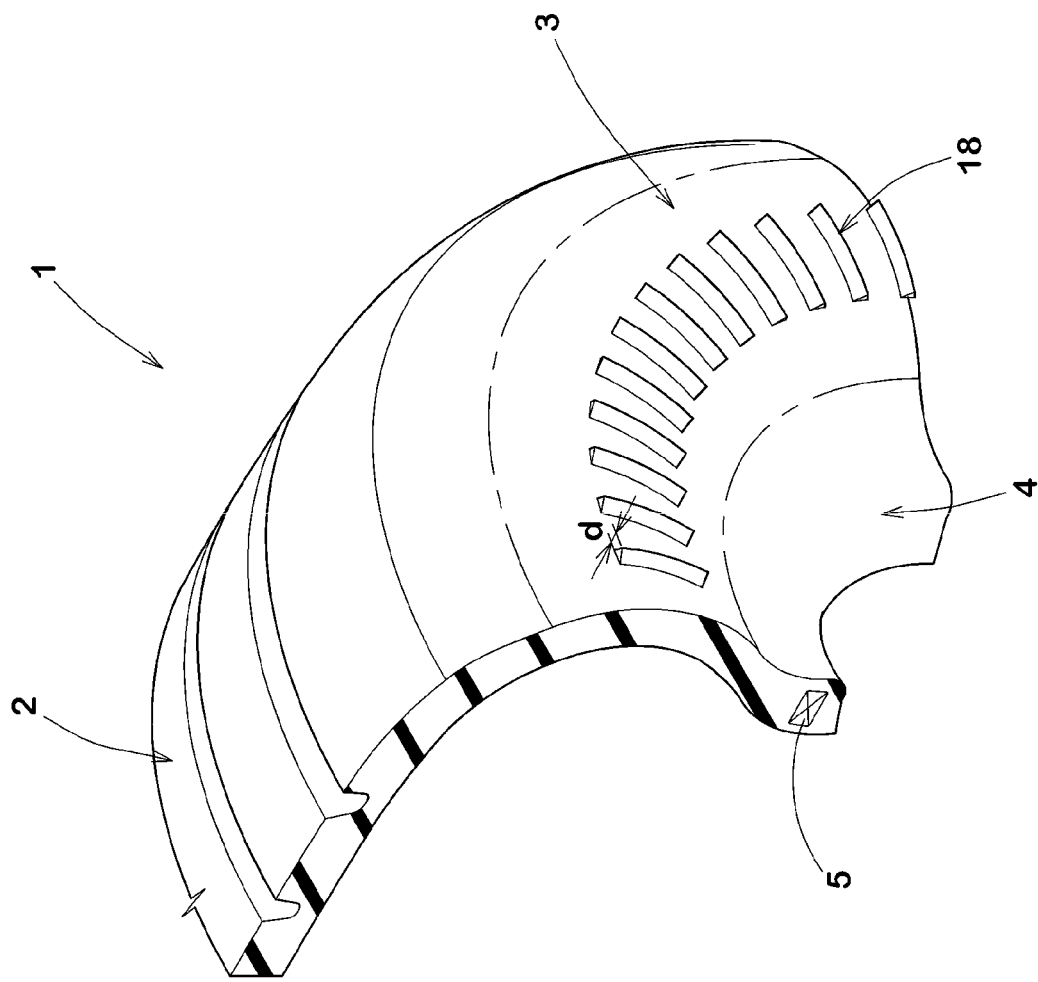
FIG. 6 is a perspective view of a sidewall portion of the run-flat tire showing a fin thereon.

Referring to FIG. 6, in order to further improve the advantage described above, the sidewall portion 3 may be provided with a plurality of fins 18 that protrude axially outwardly of the tire on the sidewall portion 3. In this embodiment, fins 18 are arranged in a circumferential direction of the tire with a certain interval and each of which extends along the radial direction of the tire with a triangular cross section. Preferably, the fin 18 has a circumferential width in a range of from 0.5 to 5.0 mm, a radial length in a range of from 5 to 40 mm, and a protruding height d in a range of from 0.5 to 5.0 mm.

In the event that a three-dimensional protruding rib or dent such as the dimple 16, the fin 18, characters, marks or the like for informing certain information or for decorating of the tire is provided on the outer surface of the sidewall portion 3 or the bead portion 4, thicknesses $ts3$, $ts4$ of the sidewall rubber elements 3G are defined except for the three-dimensional protruding rib or dent, respectively.

The present invention is more specifically described and explained by means of the following Examples and References. It is to be understood that the present invention is not limited to embodiment described above and the Examples described later.

Comparison Test

Run-flat tires having the same internal structure of FIG. 1 except for details shown in Tables 1-2 were made, and tested. Major common specification of each run-flat tire is as follows.

Complex Elastic Modulus E*
- sidewall rubber element: 3.5 MPa
- Clinch rubber element: 8.1 MPa
- Bead apex element: 11.0 MPa
- Topping rubber of carcass ply: 10.7 MPa
- Rubber chafer element: 4.4 MPa Carcass cords: Rayon 1840 dtex/2

Dimple
- Radial length: 8.8 mm
- Circumferential length: 18.0 mm
- Depth: 1.8 mm
- Radius of curvature of bottom: 1.0 mm
- Radius of curvature of corners in outline: 2.8 mm Test methods are as follows.

Run-Flat Durability Test:

The test tire was mounted on a drum tester using its standard rim with an inner pressure of 0 kPa and travel distance thereof without abnormal noise was measured at a speed of 80 km/h and a tire load of 5.11 kN. The travel distance above is preferably more than 100 km.

Spring Constant Test:

In order to obtain the vertical spring constant of test tires, the tire was inflated to the pressure of 200 kPa and loaded with a tire load of 4.59 kN, and then the vertical deflection of the tire was measured. The approximate spring constant of the tire was calculated by dividing the tire load of 4.59N by the deflection of the tire. The results are shown in Table 1 by an index based on Ex. 1 being 100, wherein the smaller the spring constant, the better the ride comfort.

Rolling Resistance Test:

The test tire was mounted on the standard wheel rim with an inner pressure of 200 kPa and the rolling resistance was measured at a speed of 80 km/h and a tire load of 4.14 kN, using a tester. The results are indicated by a percentage of the value that is divided the difference of rolling resistance from the Ex. 1 by the value of rolling resistance of Ex. 1. The smaller the percentage, the better the rolling resistance is.

Tire Mass Test:

The mass of each tire was measured. The results are indicated by an index based on Ex. 1 being 100. The smaller the index, the better the tire mass is.

Notes for Tables 1-2:

The "Parameter G1" was calculated using "$ti1/\{(10.3-0.32P) \cdot LI\}$" that is a part of the relation (1) as mentioned above.

The "Parameter G2" was calculated using $ti2/\{(8.5-0.32P) \cdot LI\}$ that are a part of the relation (2) as mentioned above.

The "Parameter G3" was calculated using $(ti3+ti4)/\{(7.5-0.32P) \cdot 2LI\}$ that are a part of the relation (3) as mentioned above.

The "Parameter G4" was calculated using $(ts3+ts4)/(12 \cdot LI)$ that are a part of the relation (4) as mentioned above.

The speed rating indicates the maximum speed at which the tire can carry a load corresponding to its load index. The "Speed rating" is defined as a single letter based on the tire standard organization such as JATMA in Japan as follows:

S: 180 km/h,
H: 210 km/h,
v: 240 km/h and
w: 270 km/h.

Each loss tangent (tan δ) of sidewall reinforcing layer was measured in the conditions of temperature of 25 deg. C., initial strain of 3%, dynamic distortion of plus/minus 2%, frequency of 10 Hz, and amplitude of 2%, by using a viscoelasticity spectrometer, based on JIS-K5394.

The Ex. 19 has no decoration mark on its sidewall portion.

The indication "conventional" in the column of "overlap length La of inner liner" means that the inner liner is disposed so as to extend between bead portions.

Test results are shown in Tables 1-2.

TABLE 1-1

|  | Ex. 1 | Ref. 1 | Ref. 2 | Ref. 3 | Ex. 2 | Ex. 3 | Ref. 4 |
| --- | --- | --- | --- | --- | --- | --- | --- |
| Tire section width (mm) | 235 | 235 | 235 | 235 | 235 | 235 | 235 |
| Aspect ratio (%) | 55 | 55 | 55 | 55 | 55 | 55 | 55 |
| Rim size (Inch) | 18 | 18 | 18 | 18 | 18 | 18 | 18 |
| Load index LI (Index) | 100 | 100 | 100 | 100 | 100 | 100 | 100 |
| Speed rating | V | V | V | V | V | V | V |
| Complex elastic modulus of sidewall reinforcing layer (MPa) | 7.2 | 7.2 | 7.2 | 7.2 | 7.2 | 7.2 | 7.2 |
| Los tangent (tanδ) of sidewall reinforcing layer | 0.042 | 0.042 | 0.042 | 0.042 | 0.042 | 0.042 | 0.042 |
| Tire section height H0 (mm) | 129 | 129 | 129 | 129 | 129 | 129 | 129 |
| Tire overall-width position height H1 (mm) | 71 | 71 | 71 | 71 | 71 | 71 | 71 |
| Buttress position height H2 (mm) | 93 | 93 | 93 | 93 | 93 | 93 | 93 |
| First bead position height H4 (mm) | 28 | 28 | 28 | 28 | 28 | 28 | 28 |
| Second bead position height H5 (mm) | 44 | 44 | 44 | 44 | 44 | 44 | 44 |
| Bead apex element height Hb/H0 | 0.36 | 0.16 | 0.54 | 0.24 | 0.3 | 0.48 | 0.5 |
| Parameter G1 | 0.01 | 0.0063 | 0.0125 | 0.01 | 0.01 | 0.01 | 0.01 |
| Thickness ti1 of sidewall reinforcing layer at tire overall-width position (mm) | 8 | 5 | 10 | 8 | 8 | 8 | 8 |
| Parameter G2 | 0.01 | 0.0084 | 0.0129 | 0.01 | 0.01 | 0.01 | 0.01 |
| Thickness ti2 of sidewall reinforcing layer at buttress position (mm) | 6.2 | 5.2 | 8 | 6.2 | 6.2 | 6.2 | 6.2 |
| Thickness tb of tire at 17 mm height (mm) | 14 | 10 | 18 | 14 | 14 | 14 | 14 |
| Thickness ti4 of sidewall reinforcing layer at second bead position (mm) | 6.8 | 5.2 | 7 | 6.8 | 6.8 | 6.8 | 6.8 |
| Thickness ti3 of sidewall reinforcing layer at first bead position (mm) | 3.6 | 2.8 | 3.7 | 3.6 | 3.6 | 3.6 | 3.6 |
| Parameter G3 | 0.01 | 0.01 | 0.013 | 0.01 | 0.01 | 0.01 | 0.01 |
| Thickness ts4 of sidewall rubber layer at second bead position (mm) | 7 | 5.4 | 8.3 | 7 | 7 | 7 | 7 |
| Thickness ts3 of sidewall rubber layer at first bead position (mm) | 5 | 3.8 | 5.9 | 5 | 5 | 5 | 5 |
| Parameter G4 | 0.01 | 0.01 | 0.0133 | 0.01 | 0.01 | 0.01 | 0.01 |
| Dimples on sidewall portion | None | None | None | None | None | None | None |
| Overlap length La of inner liner (mm) | Conv. | Conv. | Conv. | Conv. | Conv. | Conv. | Conv. |
| Run-flat durability (km) | 176 | 25 | 301 | 88 | 169 | 194 | 194 |
| Rolling resistance (Index) | — | 4 | 10 | −1 | −1 | 1 | 3 |
| Spring constant (Index) | 100 | 93 | 110 | 98 | 98 | 101 | 108 |
| Tire mass (Index) | 100 | 93 | 106 | 97 | 99 | 101 | 103 |

TABLE 1-2

|  | Ref. 5 | Ex. 4 | Ex. 5 | Ref. 6 | Ref. 7 | Ex. 6 | Ex. 7 |
| --- | --- | --- | --- | --- | --- | --- | --- |
| Tire section width (mm) | 235 | 235 | 235 | 235 | 235 | 235 | 235 |
| Aspect ratio (%) | 55 | 55 | 55 | 55 | 55 | 55 | 55 |
| Rim size (Inch) | 18 | 18 | 18 | 18 | 18 | 18 | 18 |
| Load index LI (Index) | 100 | 100 | 100 | 100 | 100 | 100 | 100 |
| Speed rating | V | V | V | V | V | V | V |
| Complex elastic modulus of sidewall reinforcing layer (MPa) | 7.2 | 7.2 | 7.2 | 7.2 | 7.2 | 7.2 | 7.2 |
| Los tangent (tan$\delta$) of sidewall reinforcing layer | 0.042 | 0.042 | 0.042 | 0.042 | 0.042 | 0.042 | 0.042 |
| Tire section height H0 (mm) | 129 | 129 | 129 | 129 | 129 | 129 | 129 |
| Tire overall-width position height H1 (mm) | 71 | 71 | 71 | 71 | 71 | 71 | 71 |
| Buttress position height H2 (mm) | 93 | 93 | 93 | 93 | 93 | 93 | 93 |
| First bead position height H4 (mm) | 28 | 28 | 28 | 28 | 28 | 28 | 28 |
| Second bead position height H5 (mm) | 44 | 44 | 44 | 44 | 44 | 44 | 44 |
| Bead apex element height Hb/H0 | 0.36 | 0.36 | 0.36 | 0.36 | 0.36 | 0.36 | 0.36 |
| Parameter G1 | 0.008 | 0.009 | 0.011 | 0.012 | 0.01 | 0.01 | 0.01 |
| Thickness ti1 of sidewall reinforcing layer at tire overall-width position (mm) | 6.4 | 7.2 | 8 | 8.8 | 9.6 | 8 | 8 |
| Parameter G2 | 0.01 | 0.01 | 0.01 | 0.01 | 0.0084 | 0.0092 | 0.0108 |
| Thickness ti2 of sidewall reinforcing layer at buttress position (mm) | 6.2 | 6.2 | 6.2 | 6.2 | 5.2 | 5.7 | 6.7 |
| Thickness tb of tire at 17 mm height (mm) | 14 | 14 | 14 | 14 | 14 | 14 | 14 |
| Thickness ti4 of sidewall reinforcing layer at second bead position (mm) | 6.8 | 6.8 | 6.8 | 6.8 | 6.8 | 6.8 | 6.8 |
| Thickness ti3 of sidewall reinforcing layer at first bead position (mm) | 3.6 | 3.6 | 3.6 | 3.6 | 3.6 | 3.6 | 3.6 |
| Parameter G3 | 0.01 | 0.01 | 0.01 | 0.01 | 0.01 | 0.01 | 0.01 |
| Thickness ts4 of sidewall rubber layer at second bead position (mm) | 7 | 7 | 7 | 7 | 7 | 7 | 7 |
| Thickness ts3 of sidewall rubber layer at first bead position (mm) | 5 | 5 | 5 | 5 | 5 | 5 | 5 |
| Parameter G4 | 0.01 | 0.01 | 0.01 | 0.01 | 0.01 | 0.01 | 0.01 |
| Dimples on sidewall portion | None | None | None | None | None | None | None |
| Overlap length La of inner liner (mm) | Conv. | Conv. | Conv. | Conv. | Conv. | Conv. | Conv. |
| Run-flat durability (km) | 63 | 136 | 216 | 220 | 75 | 173 | 194 |
| Rolling resistance (Index) | −1 | −1 | 1 | 6 | −5 | −2 | 1 |
| Spring constant (Index) | 97 | 98 | 102 | 107 | 99 | 99 | 101 |
| Tire mass (Index) | 97 | 99 | 101 | 103 | 98 | 99 | 101 |

TABLE 1-3

|  | Ref. 8 | Ref. 9 | Ex. 8 | Ex. 9 | Ref. 10 | Ref. 11 | Ex. 10 | Ex. 11 |
| --- | --- | --- | --- | --- | --- | --- | --- | --- |
| Tire section width (mm) | 235 | 235 | 235 | 235 | 235 | 235 | 235 | 235 |
| Aspect ratio (%) | 55 | 55 | 55 | 55 | 55 | 55 | 55 | 55 |
| Rim size (Inch) | 18 | 18 | 18 | 18 | 18 | 18 | 18 | 18 |
| Load index LI (Index) | 100 | 100 | 100 | 100 | 100 | 100 | 100 | 100 |
| Speed rating | V | V | V | V | V | V | V | V |
| Complex elastic modulus of sidewall reinforcing layer (MPa) | 7.2 | 7.2 | 7.2 | 7.2 | 7.2 | 7.2 | 7.2 | 7.2 |
| Los tangent (tan$\delta$) of sidewall reinforcing layer | 0.042 | 0.042 | 0.042 | 0.042 | 0.042 | 0.042 | 0.042 | 0.042 |
| Tire section height H0 (mm) | 129 | 129 | 129 | 129 | 129 | 129 | 129 | 129 |
| Tire overall-width position height H1 (mm) | 71 | 71 | 71 | 71 | 71 | 71 | 71 | 71 |
| Buttress position height H2 (mm) | 93 | 93 | 93 | 93 | 93 | 93 | 93 | 93 |
| First bead position height H4 (mm) | 28 | 28 | 28 | 28 | 28 | 28 | 28 | 28 |
| Second bead position height H5 (mm) | 44 | 44 | 44 | 44 | 44 | 44 | 44 | 44 |
| Bead apex element height Hb/H0 | 0.36 | 0.36 | 0.36 | 0.36 | 0.36 | 0.36 | 0.36 | 0.36 |
| Parameter G1 | 0.01 | 0.012 | 0.012 | 0.012 | 0.012 | 0.01 | 0.01 | 0.01 |
| Thickness ti1 of sidewall reinforcing layer at tire overall-width position (mm) | 8 | 8 | 8 | 8 | 8 | 8 | 8 | 8 |
| Parameter G2 | 0.0116 | 0.01 | 0.01 | 0.01 | 0.01 | 0.01 | 0.01 | 0.01 |
| Thickness ti2 of sidewall reinforcing layer at buttress position (mm) | 7.2 | 6.2 | 6.2 | 6.2 | 6.2 | 7.2 | 7.2 | 7.2 |
| Thickness tb of tire at 17 mm height (mm) | 14 | 10 | 12 | 16 | 18 | 14 | 14 | 14 |
| Thickness ti4 of sidewall reinforcing layer at second bead position (mm) | 6.8 | 6.8 | 6.8 | 6.8 | 6.8 | 5.4 | 6.1 | 7.5 |
| Thickness ti3 of sidewall reinforcing layer at first bead position (mm) | 3.6 | 3.6 | 3.6 | 3.6 | 3.6 | 2.9 | 3.2 | 4 |
| Parameter G3 | 0.01 | 0.01 | 0.01 | 0.01 | 0.01 | 0.008 | 0.009 | 0.011 |
| Thickness ts4 of sidewall rubber layer at second bead position (mm) | 7 | 7 | 7 | 7 | 7 | 7 | 7 | 7 |
| Thickness ts3 of sidewall rubber layer at first bead position (mm) | 5 | 5 | 5 | 5 | 5 | 5 | 5 | 5 |
| Parameter G4 | 0.01 | 0.01 | 0.01 | 0.01 | 0.01 | 0.01 | 0.01 | 0.01 |
| Dimples on sidewall portion | None | None | None | None | None | None | None | None |
| Overlap length La of inner liner (mm) | Conv. | Conv. | Conv. | Conv. | Conv. | Conv. | Conv. | Conv. |
| Run-flat durability (km) | 206 | 49 | 169 | 210 | 213 | 69 | 156 | 200 |
| Rolling resistance (Index) | 6 | −1 | 0 | 1 | 2 | −1 | 0 | 1 |
| Spring constant (Index) | 106 | 97 | 99 | 101 | 103 | 97 | 99 | 101 |
| Tire mass (Index) | 102 | 98 | 99 | 101 | 103 | 97 | 99 | 101 |

TABLE 1-4

|  | Ref. 12 | Ref. 13 | Ex. 12 | Ex. 13 | Ref. 14 | Ref. 15 | Ex. 14 | Ex. 15 |
| --- | --- | --- | --- | --- | --- | --- | --- | --- |
| Tire section width (mm) | 235 | 235 | 235 | 235 | 235 | 235 | 235 | 235 |
| Aspect ratio (%) | 55 | 55 | 55 | 55 | 55 | 55 | 55 | 55 |
| Rim size (Inch) | 18 | 18 | 18 | 18 | 18 | 18 | 18 | 18 |
| Load index LI (Index) | 100 | 100 | 100 | 100 | 100 | 100 | 100 | 100 |
| Speed rating | V | V | V | V | V | V | V | V |
| Complex elastic modulus of sidewall reinforcing layer (MPa) | 7.2 | 7.2 | 7.2 | 7.2 | 7.2 | 5 | 6 | 8.6 |
| Los tangent (tanδ) of sidewall reinforcing layer | 0.042 | 0.042 | 0.042 | 0.042 | 0.042 | 0.03 | 0.03 | 0.035 |
| Tire section height H0 (mm) | 129 | 129 | 129 | 129 | 129 | 129 | 129 | 129 |
| Tire overall-width position height H1 (mm) | 71 | 71 | 71 | 71 | 71 | 71 | 71 | 71 |
| Buttress position height H2 (mm) | 93 | 93 | 93 | 93 | 93 | 93 | 93 | 93 |
| First bead position height H4 (mm) | 28 | 28 | 28 | 28 | 28 | 28 | 28 | 28 |
| Second bead position height H5 (mm) | 44 | 44 | 44 | 44 | 44 | 44 | 44 | 44 |
| Bead apex element height Hb/H0 | 0.36 | 0.36 | 0.36 | 0.36 | 0.36 | 0.36 | 0.36 | 0.36 |
| Parameter G1 | 0.01 | 0.01 | 0.01 | 0.01 | 0.01 | 0.01 | 0.01 | 0.01 |
| Thickness ti1 of sidewall reinforcing layer at tire overall-width position (mm) | 8 | 8 | 8 | 8 | 8 | 8.7 | 8.4 | 7.6 |
| Parameter G2 | 0.01 | 0.01 | 0.01 | 0.01 | 0.01 | 0.01 | 0.01 | 0.01 |
| Thickness ti2 of sidewall reinforcing layer at buttress position (mm) | 7.2 | 7.2 | 7.2 | 7.2 | 7.2 | 6.9 | 6.6 | 5.8 |
| Thickness tb of tire at 17 mm height (mm) | 14 | 14 | 14 | 14 | 14 | 14 | 14 | 14 |
| Thickness ti4 of sidewall reinforcing layer at second bead position (mm) | 8.2 | 8.2 | 8.2 | 8.2 | 8.2 | 7.7 | 7.3 | 6.2 |
| Thickness ti3 of sidewall reinforcing layer at first bead position (mm) | 4.3 | 4.3 | 4.3 | 4.3 | 4.3 | 4.1 | 3.9 | 3.3 |
| Parameter G3 | 0.012 | 0.01 | 0.01 | 0.01 | 0.01 | 0.01 | 0.01 | 0.01 |
| Thickness ts4 of sidewall rubber layer at second bead position (mm) | 7 | 5.9 | 6.4 | 7.6 | 8.1 | 7 | 7 | 7 |
| Thickness ts3 of sidewall rubber layer at first bead position (mm) | 5 | 4.2 | 4.6 | 5.4 | 5.8 | 5 | 5 | 5 |
| Parameter G4 | 0.01 | 0.0084 | 0.0092 | 0.0108 | 0.0116 | 0.01 | 0.01 | 0.01 |
| Dimples on sidewall portion | None | None | None | None | None | None | None | None |
| Overlap length La of inner liner (mm) | Conv. | Conv. | Conv. | Conv. | Conv. | Conv. | Conv. | Conv. |
| Run-flat durability (km) | 231 | 98 | 160 | 194 | 223 | 94 | 173 | 181 |
| Rolling resistance (Index) | 3 | 0 | 0 | −1 | −3 | −1 | 0 | 0 |
| Spring constant (Index) | 103 | 99 | 100 | 101 | 102 | 99 | 100 | 101 |
| Tire mass (Index) | 103 | 97 | 99 | 101 | 103 | 101 | 101 | 99 |

TABLE 1-5

|  | Ex. 16 | Ex. 17 | Ref. 16 | Ex. 18 | Ex. 19 | Ex. 20 | Ex. 21 | Ex. 22 |
| --- | --- | --- | --- | --- | --- | --- | --- | --- |
| Tire section width (mm) | 235 | 235 | 235 | 235 | 235 | 235 | 235 | 235 |
| Aspect ratio (%) | 55 | 55 | 55 | 55 | 55 | 55 | 55 | 55 |
| Rim size (Inch) | 18 | 18 | 18 | 18 | 18 | 18 | 18 | 18 |
| Load index LI (Index) | 100 | 100 | 100 | 100 | 100 | 100 | 100 | 100 |
| Speed rating | V | V | V | V | V | V | V | V |
| Complex elastic modulus of sidewall reinforcing layer (MPa) | 10.5 | 12 | 13.5 | 7.2 | 7.2 | 7.2 | 7.2 | 7.2 |
| Los tangent (tanδ) of sidewall reinforcing layer | 0.034 | 0.04 | 0.045 | 0.042 | 0.042 | 0.042 | 0.042 | 0.042 |
| Tire section height H0 (mm) | 129 | 129 | 129 | 129 | 129 | 129 | 129 | 129 |
| Tire overall-width position height H1 (mm) | 71 | 71 | 71 | 71 | 71 | 71 | 71 | 71 |
| Buttress position height H2 (mm) | 93 | 93 | 93 | 93 | 93 | 93 | 93 | 93 |
| First bead position height H4 (mm) | 28 | 28 | 28 | 28 | 28 | 28 | 28 | 28 |
| Second bead position height H5 (mm) | 44 | 44 | 44 | 44 | 44 | 44 | 44 | 44 |
| Bead apex element height Hb/H0 | 0.36 | 0.36 | 0.36 | 0.36 | 0.36 | 0.36 | 0.36 | 0.36 |
| Parameter G1 | 0.01 | 0.01 | 0.01 | 0.01 | 0.01 | 0.01 | 0.01 | 0.01 |
| Thickness ti1 of sidewall reinforcing layer at tire overall-width position (mm) | 6.9 | 6.5 | 6 | 8 | 8 | 8 | 8 | 8 |
| Parameter G2 | 0.01 | 0.01 | 0.01 | 0.01 | 0.01 | 0.01 | 0.01 | 0.01 |
| Thickness ti2 of sidewall reinforcing layer at buttress position (mm) | 5.1 | 4.7 | 4.2 | 6.2 | 6.2 | 6.2 | 6.2 | 6.2 |
| Thickness tb of tire at 17 mm height (mm) | 14 | 14 | 14 | 14 | 14 | 14 | 14 | 14 |
| Thickness ti4 of sidewall reinforcing layer at second bead position (mm) | 5.4 | 4.8 | 4.2 | 6.8 | 6.8 | 6.8 | 6.8 | 6.8 |
| Thickness ti3 of sidewall reinforcing layer at first bead position (mm) | 2.9 | 2.5 | 2.2 | 3.6 | 3.6 | 3.6 | 3.6 | 3.6 |
| Parameter G3 | 0.01 | 0.01 | 0.01 | 0.01 | 0.01 | 0.01 | 0.01 | 0.01 |
| Thickness ts4 of sidewall rubber layer at second bead position (mm) | 7 | 7 | 7 | 7 | 7 | 7 | 7 | 7 |
| Thickness ts3 of sidewall rubber layer at first bead position (mm) | 5 | 5 | 5 | 5 | 5 | 5 | 5 | 5 |
| Parameter G4 | 0.01 | 0.01 | 0.01 | 0.01 | 0.01 | 0.01 | 0.01 | 0.01 |
| Dimples on sidewall portion | None | None | None | FIG. 4B | FIG. 4C | FIG. 4A | None | FIG. 4A |
| Overlap length La of inner liner (mm) | Conv. | Conv. | Conv. | Conv. | Conv. | Conv. | 10 | 10 |
| Run-flat durability (km) | 178 | 181 | 180 | 219 | 216 | 220 | 181 | 219 |
| Rolling resistance (Index) | 1 | 0 | 1 | 0 | 0 | 0 | −1 | −1 |
| Spring constant (Index) | 100 | 101 | 107 | 100 | 100 | 100 | 98 | 98 |
| Tire mass (Index) | 99 | 98 | 97 | 101 | 100 | 100 | 97 | 98 |

TABLE 2

|  | Ex. 23 | Ex. 24 | Ex. 25 | Ex. 26 | Ex. 27 | Ref. 17 | Ex. 28 | Ex. 29 | Ref. 18 |
|---|---|---|---|---|---|---|---|---|---|
| Tire section width (mm) | 185 | 205 | 255 | 185 | 225 | 205 | 195 | 235 | 215 |
| Aspect ratio (%) | 55 | 55 | 55 | 60 | 60 | 65 | 50 | 50 | 45 |
| Rim size (Inch) | 14 | 16 | 18 | 14 | 16 | 16 | 16 | 17 | 17 |
| Load index LI (Index) | 80 | 91 | 105 | 82 | 98 | 95 | 84 | 96 | 87 |
| Speed rating | V | W | V | H | H | S | V | W | W |
| Complex elastic modulus of sidewall reinforcing layer (MPa) | 7.2 | 7.2 | 7.2 | 7.2 | 7.2 | 7.2 | 7.2 | 7.2 | 7.2 |
| Los tangent (tanδ) of sidewall reinforcing layer | 0.042 | 0.042 | 0.042 | 0.042 | 0.042 | 0.042 | 0.042 | 0.042 | 0.042 |
| Tire section height H0 (mm) | 102 | 113 | 140 | 111 | 135 | 133 | 98 | 118 | 97 |
| Tire overall-width position height H1 (mm) | 56 | 62 | 77 | 61 | 74 | 73 | 54 | 65 | 53 |
| Buttress position height H2 (mm) | 73 | 81 | 101 | 80 | 97 | 96 | 70 | 85 | 70 |
| First bead position height H4 (mm) | 22 | 25 | 31 | 24 | 30 | 29 | 21 | 26 | 21 |
| Second bead position height H5 (mm) | 35 | 38 | 48 | 38 | 46 | 45 | 33 | 40 | 33 |
| Bead apex element height Hb/H0 | 0.36 | 0.36 | 0.36 | 0.36 | 0.36 | 0.36 | 0.36 | 0.36 | 0.36 |
| Parameter G1 | 0.01 | 0.01 | 0.01 | 0.01 | 0.01 | 0.01 | 0.01 | 0.01 | 0.01 |
| Thickness ti1 of sidewall reinforcing layer at tire overall-width position (mm) | 6.4 | 7.3 | 8.4 | 6.6 | 7.8 | 7.6 | 6.7 | 7.7 | 7 |
| Parameter G2 | 0.01 | 0.01 | 0.01 | 0.01 | 0.01 | 0.01 | 0.01 | 0.01 | 0.01 |
| Thickness ti2 of sidewall reinforcing layer at buttress position (mm) | 5 | 5.6 | 6.5 | 5.1 | 6.1 | 5.9 | 5.2 | 6 | 5.4 |
| Thickness tb of tire at 17 mm height (mm) | 14 | 14 | 14 | 14 | 14 | 14 | 14 | 14 | 14 |
| Thickness ti4 of sidewall reinforcing layer at second bead position (mm) | 6.8 | 6.2 | 7.1 | 5.6 | 6.7 | 6.5 | 5.7 | 6.5 | 5.9 |
| Thickness ti3 of sidewall reinforcing layer at first bead position (mm) | 3.6 | 3.3 | 3.8 | 3 | 3.5 | 3.4 | 3 | 3.5 | 3.1 |
| Parameter G3 | 0.01 | 0.01 | 0.01 | 0.01 | 0.01 | 0.01 | 0.01 | 0.01 | 0.01 |
| Thickness ts4 of sidewall rubber layer at second bead position (mm) | 5.6 | 6.4 | 7.4 | 5.7 | 6.9 | 6.7 | 5.9 | 6.7 | 6.1 |
| Thickness ts3 of sidewall rubber layer at first bead position (mm) | 4 | 4.6 | 5.3 | 4.1 | 4.9 | 4.8 | 4.2 | 4.8 | 4.4 |
| Parameter G4 | 0.01 | 0.01 | 0.0133 | 0.01 | 0.01 | 0.01 | 0.01 | 0.01 | 0.01 |
| Dimples on sidewall portion | None | None | None | None | None | None | None | None | None |
| Overlap length La of inner liner (mm) | Conv. | Conv. | Conv. | Conv. | Conv. | Conv. | Conv. | Conv. | Conv. |
| Run-flat durability (km) | 190 | 188 | 173 | 150 | 145 | 85 | 198 | 194 | 288 |

From the test results, it was confirmed that run-flat durability of example tires in accordance with the present invention can be effectively improved compared to references. Additionally, it was confirmed that when parameters G1 to G4 as mentioned above are less than the lower limits defined in relations (1) to (4), run-flat durability was liable to deteriorate. It was also confirmed that when parameters G1 to G3 as mentioned above are more than the upper limits defined in relations (1) to (3), rolling resistance and spring constant of the tire were liable to deteriorate. Regarding the parameter G4 for determining thickness of sidewall rubber element, when the parameter G4 is more than the upper limit defined in the relation (4), spring constant and tire mass were liable to deteriorate.

The invention claimed is:
1. A run-flat tire comprising:
an aspect ratio being in a range of from 50% to 60%;
a tread portion;
a pair of sidewall portions;
a pair of bead portions each having a bead core therein, each of said bead portions having a thickness in a range of from 12 to 16 mm at a position that has a 17 mm height from a bead base-line;
a carcass consisting of a single ply of cords which extends between bead cores through the tread portion and sidewall portions;
a pair of sidewall reinforcing layers each having a crescent cross-sectional shape and disposed axially inwardly of the carcass in each said sidewall portion, said sidewall reinforcing layers made of rubber having a complex elastic modulus in a range of from 6 to 12 MPa, said sidewall reinforcing layers having radially outer ends positioned higher than a buttress position that has a height of 0.72 times a tire section height from the bead base-line, said sidewall reinforcing layers having radially inner ends positioned lower than a first bead position that has a height of 0.22 times of the tire section height from the bead base-line;
a pair of sidewall rubber elements each of which is disposed axially outwardly of the carcass in each said sidewall portion; and
a pair of bead apex elements each of which extends and tapers radially outwardly of the tire from said bead core, the bead apex elements having a height in a range of from 0.30 to 0.48 times of the tire section height from the bead base-line; wherein
the tire has the following relations (1) to (4):

$$0.009 \leq ti1/\{(10.3-0.32P) \cdot LI\} \leq 0.011 \quad (1);$$

$$0.0092 \leq ti2/\{(8.5-0.32P) \cdot LI\} \leq 0.0108 \quad (2);$$

$$0.009 \leq (ti3+ti4)/\{(7.5-0.32P) \cdot 2LI\} \leq 0.011 \quad (3); \text{ and}$$

$$0.0092 \leq (ts3+ts4)/(12 \cdot LI) \leq 0.0108 \quad (4);$$

wherein "ti1" (unit: mm) is a thickness of said sidewall reinforcing layer at a tire overall-width position that has a height of 0.55 times the tire section height from the bead base-line, "ti2" (unit: mm) is a thickness of said sidewall reinforcing layer at the buttress position, "ti3" (unit: mm) is a thickness of said sidewall reinforcing layer at the first bead position, "ti4" (unit: mm) is a thickness of said sidewall reinforcing layer at a second bead position that has a height of 0.34 times the tire section height from the bead base-line, "ts3" (unit: mm) is a thickness of said sidewall rubber element at the first bead position, "ts4" (unit: mm) is a thickness of said sidewall rubber element at the second bead position, "P"

(unit: MPa) is a complex elastic modulus of said sidewall reinforcing layer, and "LI" (index) is a load index of the tire.

2. The tire according to claim 1, wherein
a plurality of dimples are provided on an outer surface of at least one of said sidewall portions.

3. The tire according to claim 2, wherein
said dimples are provided in an area being radially inwardly of a maximum width position of the tire.

4. The tire according to claim 1, wherein
a plurality of fins are provided on an outer surface of at least one of said sidewall portions.

5. The tire according to claim 1, wherein
the tire has an internal cavity surface,
a part of the internal cavity surface is formed of an inner liner made of rubber with low air permeability, and
the inner liner is disposed between radially outer ends of said sidewall reinforcing layers so as to overlap with each sidewall reinforcing layers at a length in a range of from 3 to 15 mm.

* * * * *